(12) United States Patent
Jostmeier et al.

(10) Patent No.: US 7,735,309 B2
(45) Date of Patent: Jun. 15, 2010

(54) LINE ROUTING ARRANGEMENT

(75) Inventors: Helmut Jostmeier, Murrhardt (DE);
Rainer Ruehle, Oppenweiler (DE);
Clemens Moess, Murrhardt (DE)

(73) Assignee: Murrplastik Systemtechnik GmbH, Oppenweiler (DE)

( * ) Notice: Subject to any disclaimer, the term of this patent is extended or adjusted under 35 U.S.C. 154(b) by 0 days.

(21) Appl. No.: 12/311,506

(22) PCT Filed: Oct. 23, 2007

(86) PCT No.: PCT/EP2007/061320

§ 371 (c)(1),
(2), (4) Date: Apr. 1, 2009

(87) PCT Pub. No.: WO2008/049824

PCT Pub. Date: May 2, 2008

(65) Prior Publication Data

US 2009/0277151 A1    Nov. 12, 2009

(30) Foreign Application Priority Data

Oct. 27, 2006 (DE) .................. 10 2006 051 425
Oct. 19, 2007 (DE) .................. 10 2007 050 505

(51) Int. Cl.
*F16G 13/16* (2006.01)
*H02G 3/04* (2006.01)
*H02G 11/00* (2006.01)

(52) U.S. Cl. ................ 59/78.1; 59/900; 248/49; 248/51

(58) Field of Classification Search ............. 59/78.1, 59/900; 248/49, 51
See application file for complete search history.

(56) References Cited

U.S. PATENT DOCUMENTS 7,521,633 B2 *  4/2009  Jostmeier et al. ........... 248/68.1

(Continued)

FOREIGN PATENT DOCUMENTS

DE    103 52 461    6/2005

(Continued)

OTHER PUBLICATIONS

International Search Report.

*Primary Examiner*—David B Jones
(74) *Attorney, Agent, or Firm*—Collard & Roe, P.C.

(57) ABSTRACT

Line routing arrangement (10) having a mount (12) for holding at least one line which is designed to be flexible or articulated and can be folded such that a first section (24) can be placed over a second section (26), which is connected to it by a curved section (28), with at least one row (32) of magnets (34) which extends with its longitudinal direction running from a first mount end (14) to a second mount end (16) being arranged on a side (30) of the mount (12) which forms the lower face of the first section (24) and the upper face of the second section (26), such that, when the mount (12) is folded, magnet poles on the first section (24) are opposite magnet poles with the same name on the second section (26). The invention provides for the magnets (34) to each extend in the longitudinal direction from a first end (46) to a second end (48), and for the second end (48) of each magnet (34), when viewed in the longitudinal direction, being at least as far from the first mount end (14) as the first end (46) in the next magnet (34) in the row (32) and being arranged laterally offset, transversely with respect to the longitudinal direction, from the first end (46) of the next magnet (34) in the row (32).

11 Claims, 4 Drawing Sheets

U.S. PATENT DOCUMENTS

Figure 1:
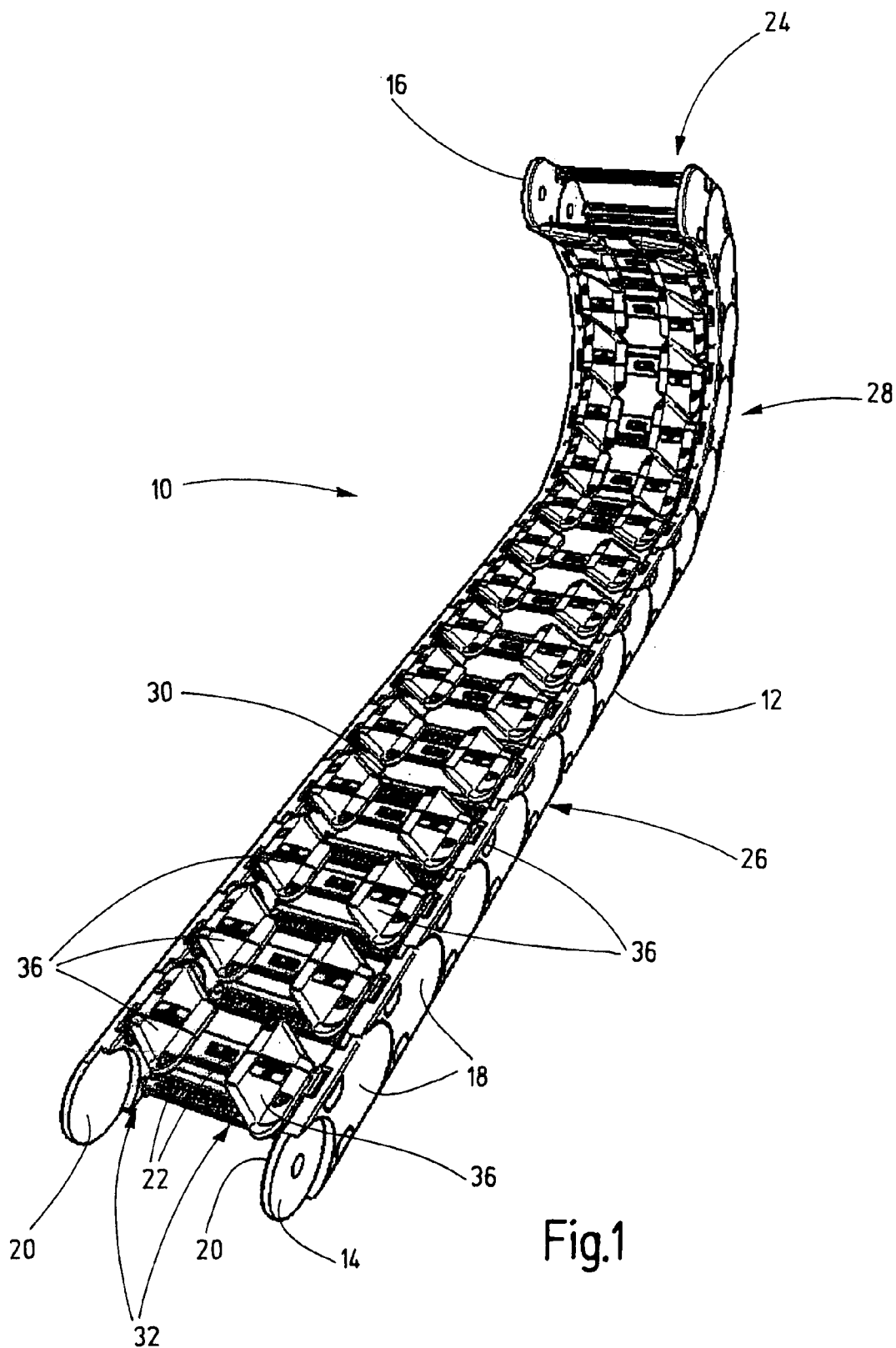

2007/0144376 A1  6/2007  Jostmeier et al.

FOREIGN PATENT DOCUMENTS

| JP | 01 288588 | * | 11/1989 |
| JP | 06 078439 | * | 3/1994 |

* cited by examiner

LINE ROUTING ARRANGEMENT

CROSS REFERENCE TO RELATED APPLICATIONS

This application is the National Stage of PCT/EP2007/061320 filed on Oct. 23, 2007, which claims priority under 35 U.S.C. §119 of German Application No. 10 2006 051 425.4 filed on Oct. 27, 2006 and German Application No. 10 2007 050 505.3 filed on Oct. 19, 2007. The international application under PCT article 21 (2) was not published in English.

The invention relates to a line routing arrangement in accordance with the preamble of claim 1.

Such line routing arrangements are known from DE 103 52 461 A1. There, for example, an energy routing chain is described, which is equipped with magnets in such a manner that its upper run is kept suspended above its lower run. As a result, wear is reduced as compared with conventional energy routing chains, in which the upper run is laid down onto the lower run. Furthermore, movement of the energy routing chain is less noisy. For these reasons, the energy routing chain has already proven itself, in excellent manner, in practice. However, in individual cases, jerky movement sequences can occur, since the magnets, which are disposed in a row, one behind the other, demonstrate gaps between one another.

It is therefore the task of the invention to further develop a line routing arrangement of the type stated initially, in such a manner that it demonstrates more uniform running.

This task is accomplished, according to the invention, by means of a line routing arrangement having the characteristics of claim 1. Advantageous further developments are the object of the dependent claims.

The invention is based on the idea of undertaking continuous placement of magnets on the carrier, in such a way that the bending radius is not restricted, or is only restricted slightly. This is achieved in that the ends of two magnets that follow one another in the row are disposed to be offset laterally, relative to one another, so that there is an interleaving of the magnet arrangement. This results in quieter running of an energy routing chain equipped with the magnet arrangement. In this connection, it should be noted that not only an energy routing chain is possible as a carrier. The solution according to the invention can be used for different types of carriers for accommodating lines, such as, for example, cables, hoses, and, in particular, line jackets in which multiple lines are combined.

It is preferred that the second end of each magnet is farther removed, viewed in the longitudinal direction, from the first carrier end than the first end of the magnet that follows in the row. This measure further improves running of the line arrangement, when the first section is guided over the second section.

Different geometrical configurations are possible for the magnets. For example, they can have a trapezoid shape or, as a special form of a trapezoid, a parallelogram shape, in a top view. It is also possible that the magnets have an arrow contour in a top view. This contour has a point at one of its ends, and a recess, complementary to the point, at the other of its ends. Finally, it is also possible that the magnets have an essentially Z-shaped outer contour in a top view. This can be created, for example, in that the magnets have the shape of two rectangles that are joined together along their broad sides, and offset relative to one another, in a top view.

It is practical if the magnets are mounted on the carrier in removable manner. In this connection, it is preferred that the magnets are accommodated in a sleeve that is mounted on the carrier, in each instance. It is advantageous if the sleeves have an accommodation pocket, in each instance, into which one of the magnets is loosely laid. With this measure, the result is achieved that the magnets can be easily mounted on an energy routing chain, for example, and can easily be replaced. Subsequent installation on a conventional energy routing chain is also possible. Furthermore, universal basic modules of the magnets can be produced for the most common energy routing chains.

It is advantageous if the sleeves consist of at least two parts that are releasably connected with one another. The accommodation pocket becomes accessible by releasing the parts from one another, so that a magnet can be removed or inserted. It is practical if the sleeve parts are connected with one another by means of engagement hooks, so that no tool is needed for joining the parts together and for releasing the parts from one another.

Figure 2:
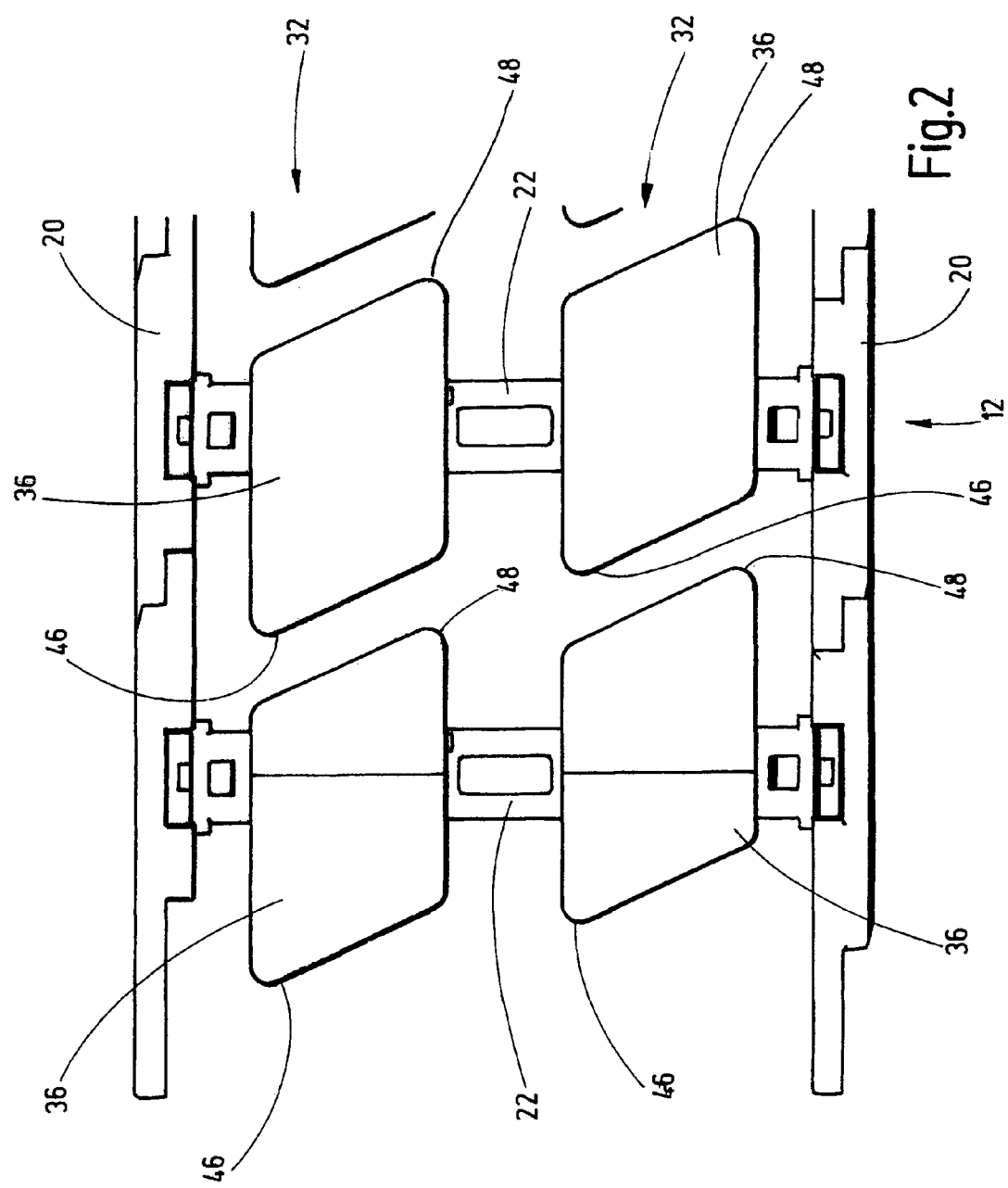
Figure 3:
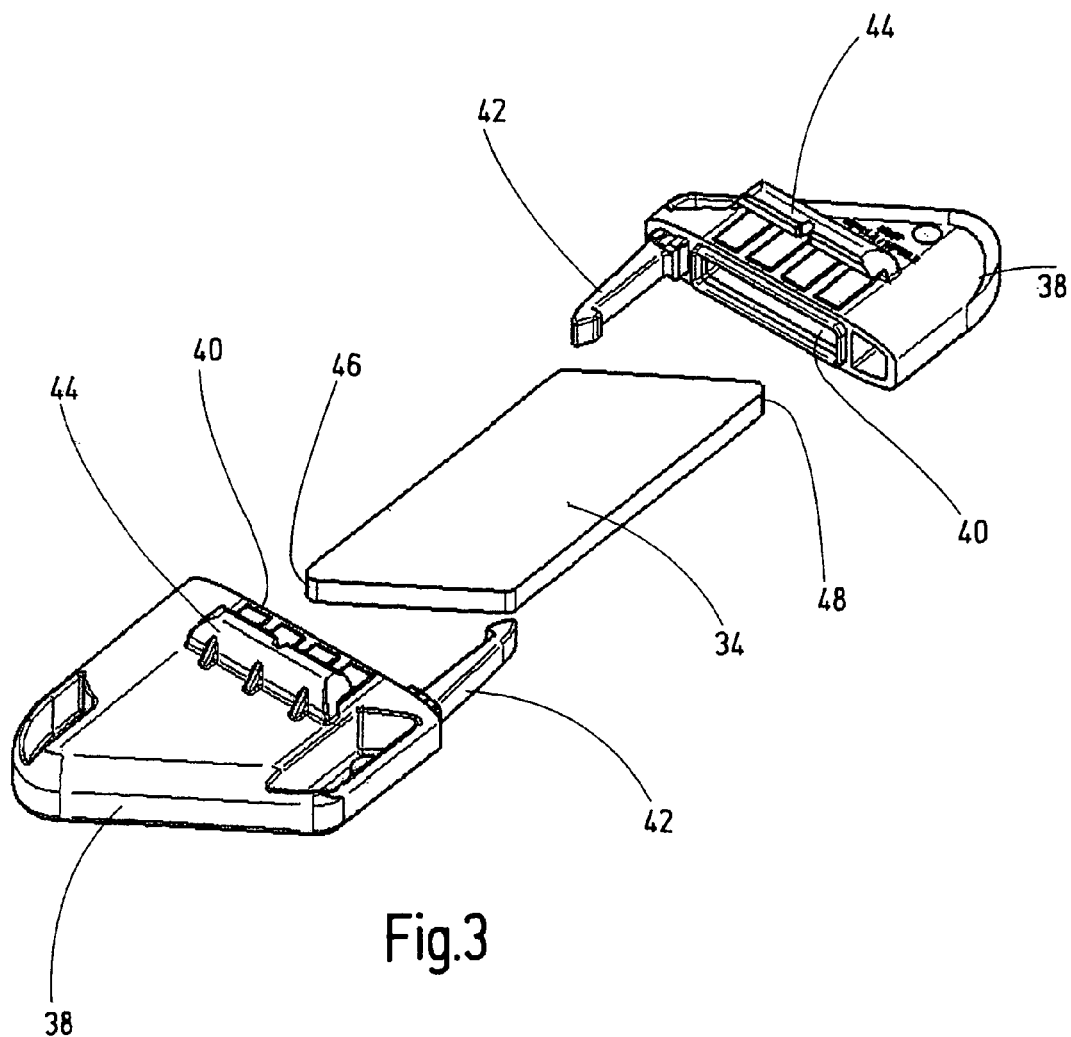
Figure 4A:
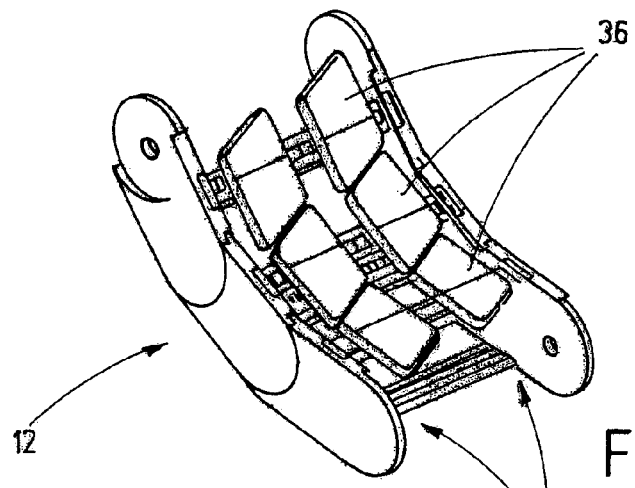

In the following, the invention will be explained in greater detail using the exemplary embodiments shown schematically in the drawing. This shows:

FIG. 1 an energy routing chain equipped with two rows of magnets;

FIG. 2 a section of the energy routing chain according to FIG. 1 in a top view;

FIG. 3 a magnet of the energy routing chain according to FIG. 1, including sleeve, and FIGS. 4a, b, c three different embodiments of an energy routing chain in a schematic representation.

A line routing arrangement 10 according to FIG. 1 is formed by an energy routing chain 12 that serves to accommodate lines such as power cables, compressed air lines, and the like. It runs, in the longitudinal direction, from a first carrier end 14 to a second carrier end 16, and has a number of chain links 18 that are disposed one behind the other in the longitudinal direction and connected with one another in articulated manner, which links have two side elements 20 that run parallel, at a distance from one another, in each instance, which elements are connected with one another by means of frame crosspieces 22. In operation, the energy routing chain 12 is installed in a fixed location with one of its ends 14, 16, and is installed on a movable processing machine with the other end 16, 14, which machine is supplied by means of the lines passed to it. In use, the chain links 18 can be pivoted relative to one another, when the energy routing chain 12 is moved, in such a manner that a first section 24 of the energy routing chain 12 can be laid down, as an upper run, onto a second section 26 as the lower run. The sections 24, 26 are connected with one another by a curved section 28.

When the upper run is laid down onto the lower run, the upper run is kept suspended above the lower run, without making contact. This is achieved in that the energy routing chain 12, at its top 30, has disposed two rows 32 of magnets 34 that run in the longitudinal direction, parallel to and at a distance from one another. Each of the magnets 34 is accommodated in a plastic sleeve 36 (FIG. 3), which consists of two sleeve parts 38 that are releasably connected with one another. These parts have an accommodation pocket 40 for accommodating the magnet 34, as well as engagement hooks 42, by means of which they can be connected with one another. Furthermore, the sleeve parts 38, which have the same construction, have attachment means 44 for attachment to the frame crosspieces 22.

Figure 4B:
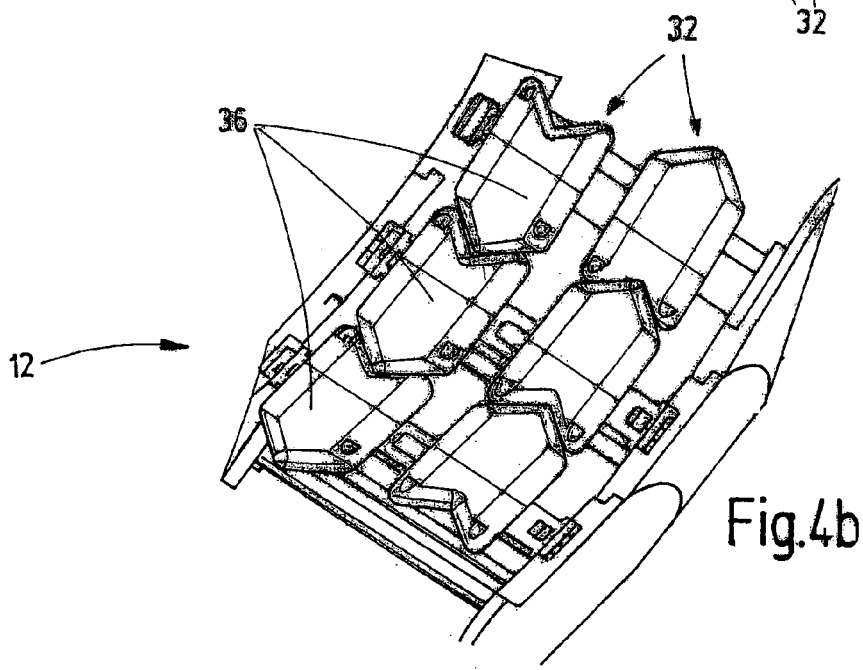
Figure 4C:
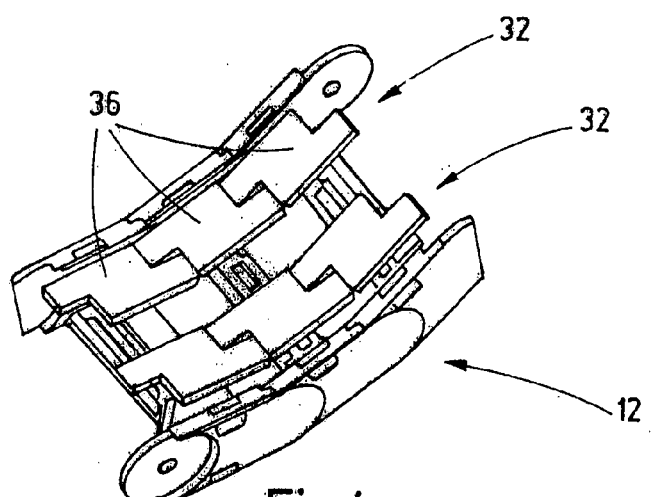

The magnets 34 of each row 32 are disposed in such a manner that the same magnet pole always points upward, so that the magnets 34 on the upper run are repelled by the magnets 34 on the lower run. In each of the rows 32, the magnets 34 extend from a first end 46, in the longitudinal direction of the energy routing chain 12, all the way to a second end 48. Although two magnets 34 that follow one another do not touch one another, so that there is sufficient space between the magnets 34 even in the curved section 28, each of the rows 32 demonstrates continuous magnetization in the longitudinal direction. This result is achieved in that the second end of each magnet is disposed offset laterally relative to the first end of the magnet that follows in the row. As a result, it is possible to dispose the second end 48 of the magnet 34 farther away from the first end 14 of the energy routing chain 12 than the first end 46 of the subsequent magnet 34. For this purpose, the magnets, in the exemplary embodiment shown in FIG. 1 to 3 and 4a, have a parallelogram shape as a special shape of the trapezoid shape, in a top view. In the exemplary embodiment shown in FIG. 4b, the magnets have an arrow contour in a top view, which has a point at one end and a recess that is complementary to the point at the other end. In the third exemplary embodiment according to FIG. 4c, the magnets are essentially Z-shaped in a top view. They have the shape of two rectangles that are laid against one another at their long sides, in each instance, and displaced a short distance, relative to one another. In all three exemplary embodiments, the outer contour of the sleeves 36 essentially corresponds to the outer contour of the magnets 34.

In summary, the following should be stated: The invention relates to a line routing arrangement 10 having a carrier 12 for accommodating at least one line, which carrier is configured to be flexible or articulated, and can be folded in such a manner that a first section 24 can be laid down above a second section 26, which is connected with the former by way of a curved section 28, whereby at least one row 32 of magnets 34 that extends from a first carrier end 14 to a second carrier end 16, running in the longitudinal direction of the carrier, is disposed on a side 30 of the carrier 12 that forms the underside of the first section 24 and the top of the second section 26, in such a manner that when the carrier 12 is folded, magnet poles on the first section 24 lie opposite magnet poles having the same name, on the second section 26. According to the invention, it is provided that the magnets 34 extend, in the longitudinal direction, from a first end 46 all the way to a second end 48, in each instance, and that the second end 48 of each magnet 34, viewed in the longitudinal direction, is at least as far away from the first carrier end 14 as the first end 46 of the magnet 34 that follows in the row 32, and is disposed to be offset laterally, crosswise to the longitudinal direction, relative to the first end 46 of the magnet 34 that follows in the row 32.

The invention claimed is:

1. A line routing arrangement comprising:
   (a) a carrier for accommodating at least one line, said carrier comprising a first section, a second section disposed beneath the first section, a curved section connecting the first section with the second section, a first carrier end, and a second carrier end, said first section having an underside facing a top side of the second section; and
   (b) at least one row of magnets extending from the first carrier end to the second carrier end in a longitudinal direction of the carrier and disposed on the underside of the first section and the top side of the second section so that magnet poles on the first section lie opposite magnet poles of the same polarity on the second section;
   wherein each magnet extends in the longitudinal direction from a respective first magnet end to a respective second magnet end, the second magnet end of each magnet being at least as far away from the first carrier end as the first magnet end of an adjacent magnet following in the at least one row and being arranged laterally offset transversely to the longitudinal direction from the first magnet end of the adjacent magnet following in the at least one row.

2. The line routing arrangement according to claim 1, wherein the magnets have a trapezoid shape in a top view.

3. The line routing arrangement according to claim 1, wherein each magnet has an arrow contour, with a point at the first magnet end and a recess at the second magnet end, in a top view.

4. The line routing arrangement according to claim 1, wherein the magnets have an essentially Z-shaped outer contour in a top view.

5. The line routing arrangement according to claim 1, wherein the magnets are installed on the carrier so as to be removable.

6. The line routing arrangement according to claim 1, wherein each magnet is accommodated in a respective sleeve installed on the carrier.

7. The line routing arrangement according to claim 6, wherein each sleeve has an accommodation pocket and each magnet is loosely laid in a respective accommodation pocket.

8. The line routing arrangement according to claim 6, wherein each sleeve comprises at least two releasably connected sleeve parts.

9. The line routing arrangement according to claim 8, wherein the sleeve parts are connected with one another via engagement hooks.

10. The line routing arrangement according to claim 1, wherein the carrier is an energy routing chain having chain links that are connected with one another in articulated manner.

11. The line routing arrangement according to claim 1, wherein the second magnet end of each magnet is farther away from the first carrier end than the first magnet end of the adjacent magnet that following in the at least one row.

* * * * *